(12) United States Patent
Ichimaru

(10) Patent No.: US 8,025,494 B2
(45) Date of Patent: Sep. 27, 2011

(54) TIRE VULCANIZER

(75) Inventor: Hironobu Ichimaru, Chikugo (JP)

(73) Assignee: Ichimaru-Giken Co., Ltd., Chikugo-shi, Fukuoka (JP)

( * ) Notice: Subject to any disclaimer, the term of this patent is extended or adjusted under 35 U.S.C. 154(b) by 135 days.

(21) Appl. No.: 12/526,004

(22) PCT Filed: Dec. 21, 2007

(86) PCT No.: PCT/JP2007/074674
§ 371 (c)(1),
(2), (4) Date: Aug. 5, 2009

(87) PCT Pub. No.: WO2008/096511
PCT Pub. Date: Aug. 14, 2008

(65) Prior Publication Data
US 2010/0278950 A1     Nov. 4, 2010

(30) Foreign Application Priority Data

Feb. 6, 2007   (JP) .................. 2007-026578

(51) Int. Cl.
*B29C 35/02*   (2006.01)
(52) U.S. Cl. ............... 425/33; 425/38; 425/43
(58) Field of Classification Search ............ 425/31, 425/32, 33, 38, 43
See application file for complete search history.

(56) References Cited

U.S. PATENT DOCUMENTS

| | | | | |
|---|---|---|---|---|
| 2,290,627 | A | * | 7/1942 | Stevens ............ 425/31 |
| 3,052,920 | A | * | 9/1962 | Harris ............ 425/33 |
| 6,620,367 | B1 | | 9/2003 | Mitamura |
| 2002/0079041 | A1 | | 6/2002 | Oobayashi et al. |

FOREIGN PATENT DOCUMENTS

| | | |
|---|---|---|
| EP | 1077122 A2 | 2/2001 |
| EP | 1215024 A2 | 6/2002 |
| JP | 10-235649 A | 9/1998 |
| JP | 2000-334740 A | 12/2000 |
| JP | 2001-58323 A | 3/2001 |
| JP | 2002-52536 A | 2/2002 |
| JP | 2002-178333 A | 6/2002 |

* cited by examiner

*Primary Examiner* — James Mackey
(74) *Attorney, Agent, or Firm* — Dickstein Shapiro LLP

(57) ABSTRACT

A tire vulcanization apparatus includes an upper container moving in a tire vulcanization position and a lower container moving between the tire vulcanization position and a shaping position, the lower container is provided with a bladder expanded/shrunk by supplying/discharging pressurized fluid from a fluid supplying apparatus, in the shaping position, a green tire is mounted on the lower container, and shaped by supplying pressurized fluid, and in the tire vulcanization position, the shaped green tire is held between the upper and lower containers and is vulcanized by supplying pressurized fluid to the bladder, a flow channel for supplying/discharging pressurized fluid from the fluid supplying apparatus to the bladder is comprised of a downstream side movable tube connected to the bladder and moving accompanied with the lower container, an upstream side fixed tube connected to the fluid supplying apparatus, and a tube for shaping made of a flexible tube to which the fluid supplying apparatus and the bladder are normally connected, and the upstream side fixed tube is so arranged that the downstream side movable tube is connected via a first joint portion in a state that the lower container has moved to the tire vulcanization position.

1 Claim, 3 Drawing Sheets

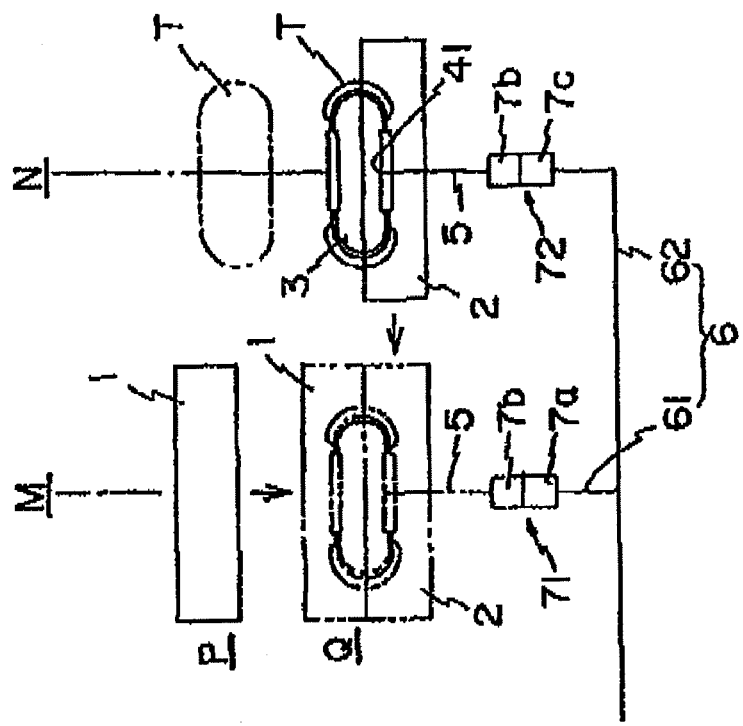
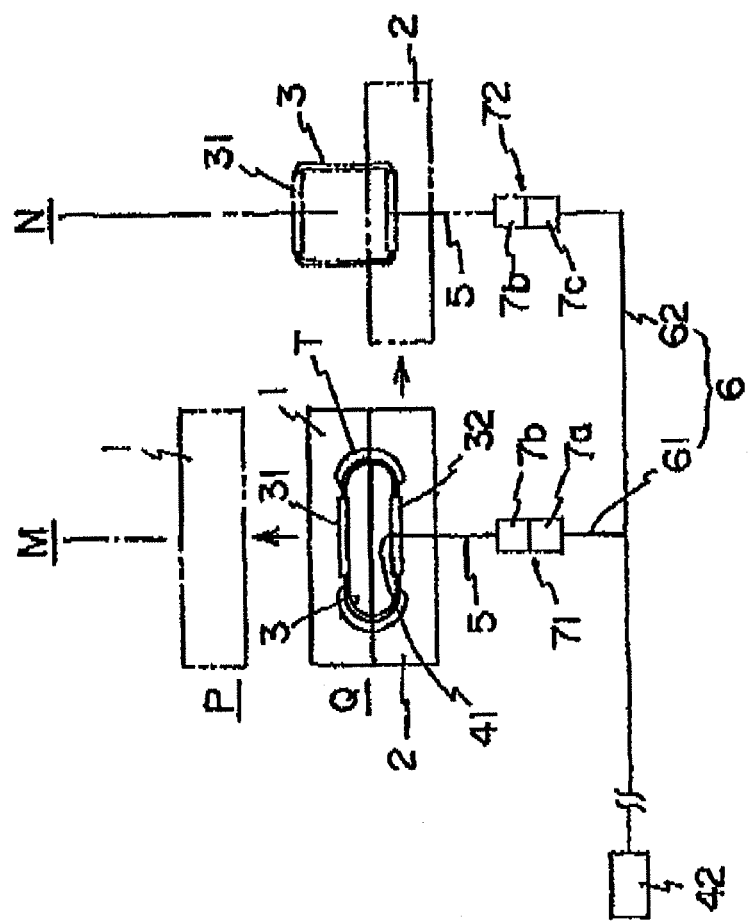
FIG.1A
FIG.1B

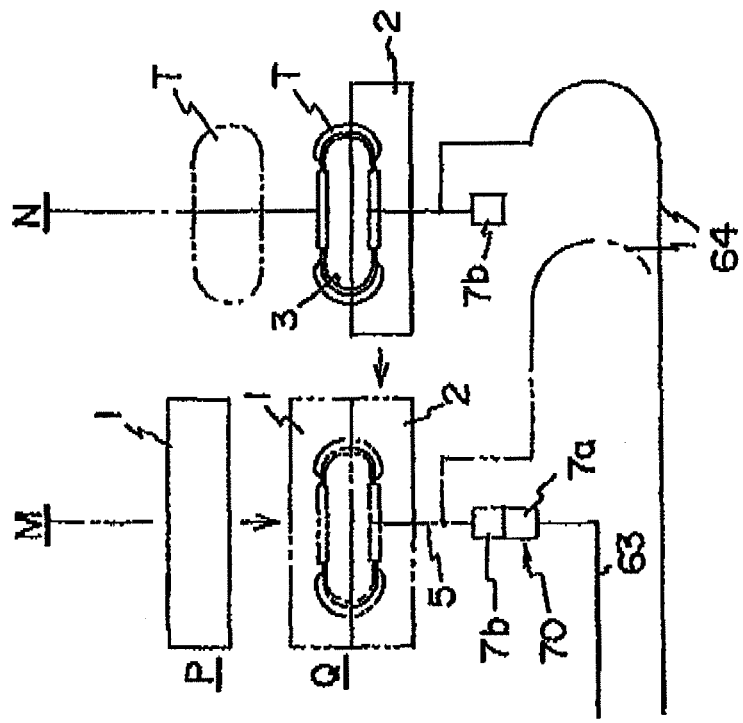
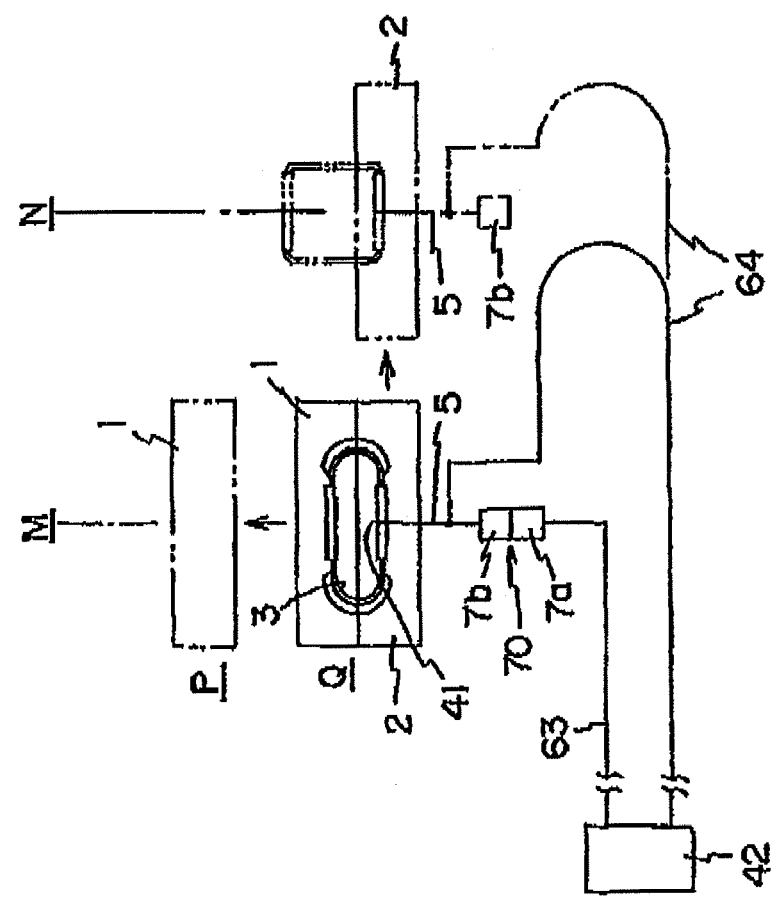
FIG.3A
FIG.3B

TIRE VULCANIZER

TECHNICAL FIELD

The present invention relates to a tire vulcanizer which is comprised of an upper container which moves up and down in a tire vulcanization position, and a lower container which moves between the tire vulcanization position and a shaping position, and more particularly, relates to a plumbing technique which supplies/discharges pressurized fluid to a bladder provided on a lower container.

BACKGROUND ART

Up to now, a tire vulcanizer which is comprised of an upper container which moves up and down in a tire vulcanization position, and a lower container which moves between the tire vulcanization position and the shaping position has been proposed (see Patent Document 1).

This tire vulcanizer, in the shaping position, mounts a green tire on the lower container, supplies pressurized fluid to a bladder in which the green tire is provided on the lower container and then expands the bladder so as to execute the shaping process.

Further, in the vulcanization position, the thus shaped green tire is held between the lower container and the upper container and the green tire is vulcanized by supplying pressurized fluid to the bladder.

Once, this prior art tire vulcanizer executes the shaping of the green tire in the shaping position and then moves the thus shaped green tire to set to the tire vulcanization position, it is possible to immediately start the vulcanization operation. Thereby, it is advantageous in that the operational performance is enabled to be enhanced.

In the prior art tire vulcanizer, a flow channel for supplying/discharging pressurized fluid from the fluid supplying apparatus to the bladder is provided on the lower container. As the tubular body in this case, a flexible tube (flexible hose) capable of flexibly bending has been utilized.

However, the fluid channel to the bladder is under a severe condition in that a high temperature fluid under high pressure (for example, high temperature steam under high pressure) flows, or a vacuum is created for exhaust purposes. Under such a severe condition, the utilization of the flexible tube causes a problem in that the flexible tube is inevitably flexed. Thus, there arises a problem in that the utilization of the flexible tube under an extremely severe condition shortens the product life.

Patent Document 1: Japanese Unexamined Patent Application Publication No. 2002-178333

BRIEF SUMMARY

In the tire vulcanization apparatus in which the lower container moves between the tire vulcanization position and the shaping position, pressurized fluid may be supplied to the bladder in the shaping position and the tire vulcanization position. During the movement of the lower container, it is not necessary to supply pressurized fluid to the bladder.

Thus, in order to solve the above-mentioned problem, according to the present invention, the first object of the present invention is to provide a tire vulcanizer in which pressurized fluid may be supplied to the bladder in the tire vulcanization position and the shaping position, and the lower container can move while an inner pressure of the bladder is held.

Further, since, in the shaping position, only a little amount of pressurized fluid having low pressure is supplied to the bladder, the usage condition is very good during shaping. In this shaping process, even if a flexible tube is utilized as a flow channel, it goes without saying that it does not affect the durable product life.

Thus, the object of the present invention is to provide a tire vulcanizer in which a flow channel for shaping apart from a flow channel for vulcanizing is provided and a flexible tube is available for shaping.

In order to overcome the above-mentioned problem, the present invention provides a tire vulcanization apparatus comprising an upper container (1) which moves up and down at a tire vulcanization position (M), and a lower container (2) which moves between the tire vulcanization position (M) and a shaping position (N), the lower container (2) is provided with a bladder (3) which is expanded/shrunk by supplying/discharging pressurized fluid from a fluid supplying apparatus (42), in the shaping position (N), a green tire (T) is mounted on the lower container (2), and the green tire (T) is shaped by supplying pressurized fluid to the bladder (3) and thus expanding the same, in the tire vulcanization position (M), the green tire (T) that has shaped is held between the upper container (1) and the lower container (2) and is vulcanized by supplying pressurized fluid to the bladder (3) and thus vulcanizing the green tire (T), the fluid supplying apparatus (42) is utilized for both supplying pressurized fluid to the bladder (3) in the shaping position (N) and supplying pressurized fluid to the bladder (3) in the tire vulcanization position (M), the flow channel for supplying/discharging pressurized fluid from the fluid supplying apparatus (42) to the bladder (3) is comprised of a downstream side movable tube (5) which is connected to the bladder (3) and moves accompanied with the movement of the lower container (2), an upstream side fixed tube (63) which is connected to the fluid supplying apparatus (42), and a tube for shaping (64) made of a flexible tube to which the fluid supplying tube (42) and the bladder (3) are normally connected, and the upstream side fixed tube (63) is so arranged that the downstream side movable tube (5) is connected via a first joint portion (71) in a state that the lower container (2) has moved to the tire vulcanization position (M), wherein the joint portion (70) is so arranged that the joint portion (70) closes the fluid channel in a state that the joint portion (70) is separated into one or more joint parts.

BRIEF DESCRIPTION OF THE DRAWINGS

FIG. 1 is a schematic view illustrating the operation of a tire vulcanization apparatus according to the present invention.

FIG. 3 is a schematic view illustrating the operation of the tire vulcanization apparatus according to the present invention.

DETAILED DESCRIPTION

Figure 2A:
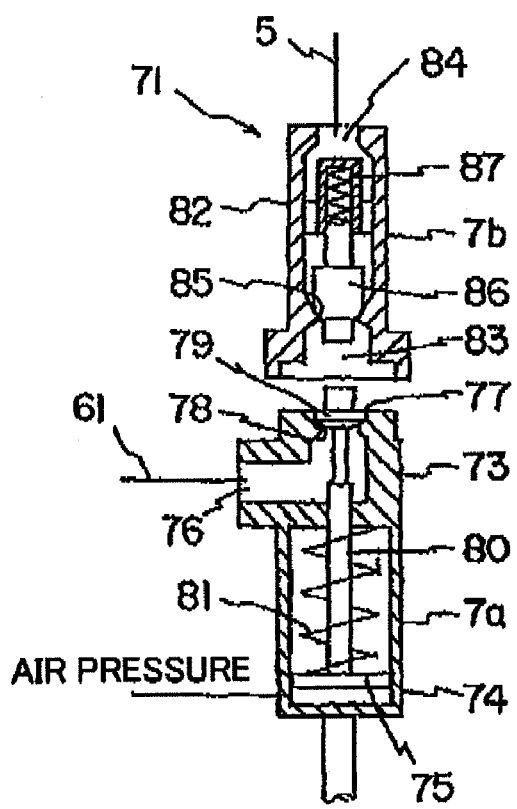
FIG. 2 is a schematic sectional view illustrating an embodiment of a first joint portion.

FIG. 1 is a schematic view illustrating a reference example of the tire vulcanization apparatus according to the present invention.

A tire vulcanizer in this reference example comprises an upper container 1 which moves up and down between a raised position P and a lowered position Q in a tire vulcanization position M, and a lower container 2 which moves between the tire vulcanization position M and a shaping position N.

Meanwhile, the upper container 1 moves up and down in a vertical direction by means of a hydraulic cylinder (not shown) and the lower container 2 reciprocates in a horizontal direction by means of a moving apparatus (not shown), A center mechanism having a bladder 3 is provided in the center of the lower container 2. The bladder is formed to a cylinder-shaped rubber body which is expandable and shrinkable. The upper end portion of the bladder 3 is fixed to an upper clamp ring 31.

The lower end portion of the bladder is fixed to a lower clamp ring 32. The lower clamp ring 32 is formed with a fluid port 41 for both supplying and discharging pressurized fluid inside the bladder 21. The bladder is expanded/shrunk by supplying/discharging pressurized fluid from a fluid supplying apparatus 42 via the fluid port 41 to the bladder 3.

Next, a fluid channel mechanism for supplying/discharging pressurized fluid to the bladder will be described.

The fluid channel to the bladder 3 is comprised of a downstream side movable tube 5 which is connected to the fluid port 41 and moves along with the movement of the lower container 2, and an upstream side fixed tube 6 which is connected to the fluid supplying apparatus 42.

The fluid supplying apparatus (42) is utilized for both supplying pressurized fluid to the bladder (3) in the shaping position (N) and supplying pressurized fluid to the bladder (3) in the tire vulcanization position (M), The upstream side fixed tube 6 comprises a first fixed tube 61 to which the downstream side movable tube 5 is connected via a first joint portion 71 in a state that the lower container 2 has moved to the tire vulcanization position M, and a second fixed tube 62 to which the upstream side movable tube 5 is connected via a second joint portion 72 in a state that the lower container 2 has moved to the shaping position N.

The first joint portion 71 is so arranged that the first fixed joint 7a attached to the first fixed tube 61 and the movable side joint 713 attached to the downstream side movable tube 5 are removably connected with each other.

The second joint portion 72 is so arranged that the second fixed joint 7c attached to the second fixed tube 62 and the movable side joint 7b attached to the downstream side movable tube 5 are removably connected with each other.

Now, referring to FIG. 2, an embodiment of the first joint portion 71 will be described.

The first joint portion 71 is so arranged that the movable side joint 7b is removably connected to the first fixed joint 7a.

A piston cylinder 74 is connected to a valve main body 73 of the first fixed joint 7a. A piston 75 which is pushed responding to air pressure is provided inside the piston cylinder 74.

Meanwhile, inside the valve main body 73 is formed with a first valve opening 78 which communicates a flow-in port 76 and a flow-out port 77. A first valve seat body 79 which opens and closes this first valve opening 78 is provided to a tip end portion of a valve stem 80 which is connected to the piston 74.

The first valve seat body 79 is normally held in a state that the same closes the first valve opening 78 due to the retiring movement of the piston 74 urged by means of a spring 81.

On the other hand, inside a valve main body 82 of the movable side joint 7b is formed with a second valve opening 85 which communicates a flow-in port 83 and a flow-out port 84. The second valve seat body 86 is normally held in a state that the same is urged by means of a spring 87 and thus closes the second valve opening 85.

Accordingly, the first valve seat body 79 and the second valve seat body 86 are opposed with the tip end surfaces of the both valve main bodies 73, 82 being joined together. Based upon the releasing and opening operation accompanied with the pressing movement of the piston 74, the tip end of the first valve seat body 79 and the tip end of the second valve seat body 86 abut against with each other to thereby release and open the second valve seat body 86. Thereby the first valve opening 78 and the second valve opening 85 are operatively opened so as to communicate the flow-in port 76 of the first fixed joint 7a and the flow-out port 84 of the movable side joint 7b.

Thus, a channel which communicates the first fixed tube 61 via the first joint portion 71 with the downstream side movable tube 5 is released and opened.

Meanwhile, in a state that the first fixed tube 7a and the movable side joint 7b are spaced away from each other, the first fixed joint 7a is held by the first valve seat body 79 in a state that the same closes the first valve opening 78 and the movable side joint 713 is held by the second valve seat body 86 in a state that the same closes the second valve opening 85.

Further, the second fixed joint 7c in the second joint portion 72 has the same structure as that of the first fixed joint 7a, Accordingly, upon vulcanizing, as a solid line shown in FIG. 1B, a green tire T is mounted on a lower container 2 at a shaping position N and the green tire T is shaped by supplying pressurized fluid to the bladder 3 and thus expanding the same.

In this shaping position N, in the second joint portion 72, the movable side joint 7b is connected to the second fixed joint 7c.

Thereafter, in a state that the green tire T has been shaped, as shown by a solid line in FIG. 1A, the lower container 2 is moved to the tire vulcanization position M. When this movement is executed, in the second joint portion 72, the movable side joint 7b is separated from the second fixed joint 7c.

In this separated state, the movable side joint 7b and the second fixed joint 7c are held in a closed state, thereby closing the fluid channel and thus enabling to maintain an inner, pressure within the bladder 3.

In a state the green tire T has been shaped, then the thus shaped green tire T is moved to the tire vulcanization position M. In this tire vulcanization position M, the upper container 1 is lowered from the raised position P to the lowered position Q and the shaped green tire T is held between the upper container 1 and the lower container 2. In this state, high temperature fluid under high pressure is supplied from one fluid supplying apparatus 42 to the bladder 3 to vulcanize the green tire T by the heat held from the upper container 1 and the lower container 2.

In this tire vulcanization position M, in the first joint portion 71, the movable side joint 7b is connected to the first fixed joint 7a.

Meanwhile, as described above, after the green tire T has been vulcanized, pressurized fluid is discharged from the bladder 3, as shown by an imaginary line in FIG. 1A, and then the upper clamp ring 31 is raised to shrink the bladder 3 and the upper container 1 is raised from the lowered position Q to the raised position P to remove the vulcanized tire and move the lower container 2 to the shaping position N.

Next, FIG. 3 is a schematic view illustrating the operation of a tire vulcanizing apparatus of another embodiment according to the present invention.

Upon explaining the tire vulcanizing apparatus, the structural features which are different from those of the tire vulcanizing apparatus shown in FIG. 1 will be described.

Figure 2B:
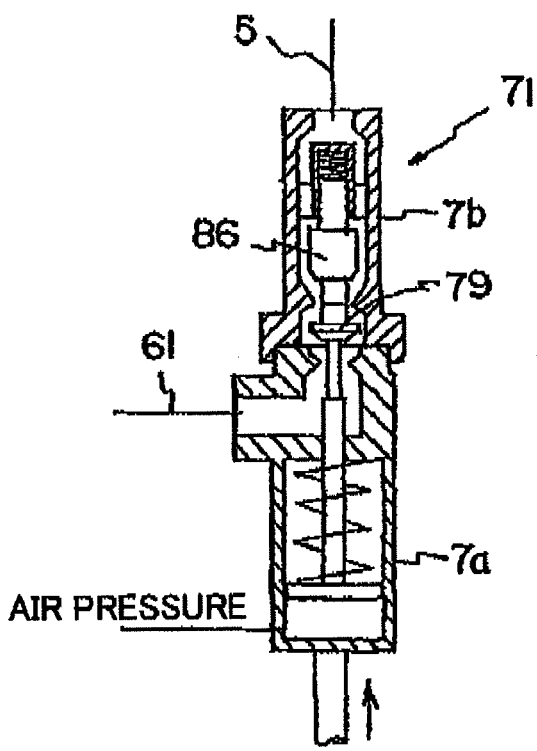

Further, a fixed joint 7a and a movable side joint 7b which constitutes a joint portion 70 have the same structure as those of the first fixed joint 7a and the movable side joint 7b shown in FIG. 2.

In this tire vulcanizing apparatus, a fluid channel for supplying/discharging pressurized fluid to the bladder 3 is comprised of a downstream side movable tube 5 which is connected to the bladder 3 and moves along with the movement of the lower container 2, an upstream side fixed tube 63 which is connected to the fluid supplying apparatus 42, and a tube for shaping 64 made of a flexible tube which is normally connected to the fluid supplying apparatus 42 and the bladder 3.

The upstream side fixed tube 63 is so arranged that the downstream side movable tube 5 is connected to the upstream side fixed tube 63 via the joint portion 70, in a state that the lower container 2 has moved to the vulcanization position M.

The joint portion 70 is arranged so that the movable side joint 7b which is attached to the downstream side tube 5 is removably connected to the fixed joint 7a which is attached to the upstream side fixed tube 63.

Accordingly, upon vulcanizing, as shown in FIG. 3B, in the shaping position N, the green tire T is mounted on the lower container 2 and is shaped by supplying pressurized fluid to the bladder 3 and expanding the same. In this shaping position N, a small amount of pressurized fluid having a low pressure is supplied via the tube for shaping 64 to the bladder 3. Meanwhile, the fixed joint 7a and the movable side joint 7b are held in a closed state.

After that, in a state that the green tire T has been shaped, as shown by a solid line in FIG. 3A, the lower container 2 is moved to the tire vulcanization position M. Upon this movement, it is possible to adjust the pressure through the tube for shaping 64 during the shaping process, thereby enabling to shorten the cycle time.

The lower container 2 in a state that the green tire T has been shaped is moved to the tire vulcanization position M. In this tire vulcanization position M, the upper container 1 is lowered and the shaped green tire T is held between the upper container 1 and the lower container 2. In this held state, pressurized fluid having a high temperature and under high pressure is supplied to the bladder 3 and thus the heat from the upper container 1 and the low container 2 vulcanizes the green tire T.

In this tire vulcanization position M, in the joint portion 70, the movable joint rib is connected to the fixed joint 7a.

In the embodiment as described above, although the fluid port 41 is used for both supplying and discharging pressurized fluid, a port for supplying and a port for discharging may be independently provided instead thereof. In this case, a supplying channel ranging from the fluid supplying apparatus to the supplying port and a discharging channel connected to the discharging port are provided and it is necessary to form a joint portion in both the supplying port and the discharging port, respectively.

Further, the joint portion which is composed of the fixed joint and the movable joint may have a structure in which the fixed joint and/or the movable side joint is/are moved and joined such as an embodiment shown in FIG. 2 after the lower container is positioned, or a structure in which the movable side container and the fixed joint are coupled with each other accompanied with the movement of the lower container.

Furthermore, as a method for communicating fluid channels after coupling the fixed joint and the movable side joint with each other, a method in which either and/or both joint is/are driven to communicate with each other, and a method in which the joint itself has no drive and thus the fluid channels are communicated with each other accompanied with the movement of the lower container are considered.

Meanwhile, when providing a tube for shaping, as an embodiment shown in FIG. 3, a valve or valves may be provided in the movable side in order to overcome the negative pressure problem.

In the tire vulcanizer according to the present invention in a state that the lower container has moved to the shaping position, pressurized fluid from the fluid supplying apparatus is supplied through a tube for shaping made of a flexible tube to the bladder to enable the green tire to be shaped.

Meanwhile, in a state that the lower container has moved to the tire vulcanization position, the downstream side movable tube is connected via the joint portion to the upstream side tube, pressurized fluid from the fluid supplying apparatus is supplied to the bladder, thereby enabling the green tire to be vulcanized.

Further, since the tube for shaping is provided, during the movement from the shaping position to the tire vulcanization position, it is possible to adjust the pressure during the shaping process and to shorten the cycle time.

Furthermore, in the present invention, the joint portion is one in the tire vulcanization point to thereby further reduce the number of joint elements.

The invention claimed is:

1. A tire vulcanization apparatus comprising an upper container which moves up and down in a tire vulcanization position, and a lower container which moves between the tire vulcanization position and a shaping position,
   the lower container is provided with a bladder which is expanded/shrunk by supplying/discharging pressurized fluid from a fluid supplying apparatus,
   in the shaping position, a green tire is mounted on the lower container, and shaped by supplying pressurized fluid to the bladder and thus expanding the same, and
   in the tire vulcanization position, the green tire that has been shaped is held between the upper container and the lower container and is vulcanized by supplying pressurized fluid to the bladder,
   the fluid supplying apparatus is utilized for both supplying pressurized fluid to the bladder in the shaping position and supplying pressurized fluid to the bladder in the tire vulcanization position,
   a flow channel for supplying/discharging pressurized fluid from the fluid supplying apparatus to the bladder is comprised of a downstream side movable tube which is connected to the bladder and moves accompanied with the movement of the lower container, an upstream side fixed tube which is connected to the fluid supplying apparatus, and a tube for shaping made of a flexible tube to which the fluid supplying apparatus and the bladder are connected, and
   the upstream side fixed tube is so arranged that the downstream side movable tube is connected via a joint portion in a state that the lower container has moved to the tire vulcanization position,
   wherein the joint portion is so arranged that the joint portion closes the flow channel in a state that the joint portion is separated into one or more joint parts.

* * * * *